(12) United States Patent
Schlegelmilch

(10) Patent No.: US 11,079,029 B2
(45) Date of Patent: Aug. 3, 2021

(54) CHECK VALVE ELEMENT FOR A CHECK VALVE ASSEMBLY AND CORRESPONDING CHECK VALVE ASSEMBLY

(71) Applicant: AUDI AG, Ingolstadt (DE)

(72) Inventor: Peter Schlegelmilch, Lenting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/763,761

(22) PCT Filed: Oct. 18, 2018

(86) PCT No.: PCT/EP2018/078531
§ 371 (c)(1),
(2) Date: May 13, 2020

(87) PCT Pub. No.: WO2019/096531
PCT Pub. Date: May 23, 2019

(65) Prior Publication Data
US 2021/0172539 A1 Jun. 10, 2021

(30) Foreign Application Priority Data
Nov. 14, 2017 (DE) ...................... 10 2017 220 229.7

(51) Int. Cl.
*F16K 15/14* (2006.01)
*F16K 15/02* (2006.01)

(52) U.S. Cl.
CPC .......... *F16K 15/144* (2013.01); *F16K 15/023* (2013.01); *F16K 15/025* (2013.01);
(Continued)

(58) Field of Classification Search
CPC .... F16K 15/144; F16K 15/023; F16K 15/028; Y10T 137/6086; Y10T 137/7888
See application file for complete search history.

(56) References Cited

U.S. PATENT DOCUMENTS 4,186,768 A    2/1980   Kuester
5,727,594 A * 3/1998   Choksi .................. A61M 39/24
                                                         137/537
(Continued)

FOREIGN PATENT DOCUMENTS

AT            384 401 B     11/1987
CN          103591339 A      2/2014
(Continued)

OTHER PUBLICATIONS

International Search Report dated Dec. 21, 2018 for International Patent Application No. PCT/EP2018/078531, 4 pages.
(Continued)

*Primary Examiner* — Kevin F Murphy
(74) *Attorney, Agent, or Firm* — Staas & Halsey LLP

(57) ABSTRACT

A resiliently mounted valve body has a sealing face and, by way of spring arms, is resiliently-elastically connected to a holding ring which encompasses the valve body in at least one position, so that the valve body is repositionable in a parallel manner in the axial direction. The holding ring is in one piece with and materially integral to a latching body for fastening a check valve element in a latching manner in a fluid-conducting installation of a check valve assembly. The latching body extends in the axial direction, facing away from the valve body, and has at least one latching protrusion which is resiliently-elastically repositionable in the radial direction.

18 Claims, 2 Drawing Sheets

(52) U.S. Cl.
CPC ....... *F16K 15/028* (2013.01); *Y10T 137/6086* (2015.04); *Y10T 137/7888* (2015.04)

(56) References Cited

U.S. PATENT DOCUMENTS

| | | | |
|---|---|---|---|
| 5,937,988 A | 8/1999 | Otto et al. | |
| 6,250,331 B1 * | 6/2001 | Nardi | A61M 1/0005 137/247.11 |
| 6,390,130 B1 * | 5/2002 | Guala | A61M 39/24 137/859 |
| 7,721,763 B2 * | 5/2010 | Choksi | F16K 15/144 137/859 |
| 2017/0107024 A1 | 4/2017 | Tamarindo | |

FOREIGN PATENT DOCUMENTS

| | | |
|---|---|---|
| CN | 103727333 A | 4/2014 |
| CN | 106102822 A | 11/2016 |
| CN | 106286926 A | 1/2017 |
| DE | 29 33 545 A1 | 3/1981 |
| DE | 29 10 660 C2 | 11/1988 |
| DE | 3621 332 C3 | 4/1993 |
| DE | 103 21 633 A1 | 11/2003 |
| DE | 10 2011 011 106 A1 | 8/2012 |
| DE | 10 2014 208 618 A1 | 11/2015 |
| EP | 2 487 395 A1 | 8/2012 |
| EP | 2 848 551 A1 | 3/2015 |
| JP | 3-33571 | 2/1991 |
| JP | 2010-84674 | 4/2010 |
| WO | 2005/108835 A1 | 11/2005 |
| WO | 2009/030761 A1 | 3/2009 |

OTHER PUBLICATIONS

English Translation by WIPO dated May 28, 2020 of the International Preliminary Report on Patentability in corresponding International Patent Application No. PCT/EP2018/078531, 8 pages.
Chinese Office Action dated May 27, 2021 from Chinese Application No. 201880062104.1, 8 pages.

* cited by examiner

CHECK VALVE ELEMENT FOR A CHECK VALVE ASSEMBLY AND CORRESPONDING CHECK VALVE ASSEMBLY

CROSS REFERENCE TO RELATED APPLICATIONS

This application is the U.S. national stage of International Application No. PCT/EP2018/078531, filed Oct. 18, 2018 and claims the benefit thereof. The International Application claims the benefit of German Application No. 10 2017 220 229.7 filed on Nov. 14, 2017, both applications are incorporated by reference herein in their entirety.

BACKGROUND

Described below is a check valve element for a check valve assembly, having a resiliently-elastically mounted valve body which has a sealing face and by way of spring arms is resiliently-elastically connected in such a manner to a holding ring which encompasses the valve body in at least one position that the valve body is repositionable in a parallel manner in the axial direction. Also described below is a check valve assembly.

The publication WO 2005/108835 A1 is known from the related art, for example. The publication relates to a valve arrangement having a valve body which is designed as part of a flat spring and has a resiliently-elastically mounted sealing face and which is movable between a closed position in which the sealing body of the opening of a valve opening bears in a sealing manner, and an opened position in which the valve body releases the valve opening. It is provided herein that the valve body is mounted by at least two holding arms which are disposed so as to be distributed about the circumference of the valve body, wherein the holding arms are elastically deformable in such a manner that the valve body is movable in a substantially planar-parallel manner and so as to be perpendicular to the valve opening.

SUMMARY

Described below is a check valve element for a check valve assembly which in comparison to known check valve elements has advantages, in particular is able to be produced in a cost-effective manner and assembled in a simple manner, and is distinguished by a lower number of parts in comparison to other solutions.

The above is achieved with the holding ring being configured so as to be in one piece with and materially integral to a latching body for the fastening the check valve element in a latching manner in a fluid-conducting installation of the check valve assembly, the latching body extending in the axial direction and facing away from the valve body, and having at least one latching protrusion which is resiliently-elastically repositionable in the radial direction.

The check valve element is typically a component part of the check valve assembly. The check valve element represents part of a check valve. To this end, the check valve element includes the valve body which is mounted so as to be repositionable and for implementing the check valve can interact with a valve seat. The valve seat is typically a component part of the check valve assembly. For example, the valve seat in the circumferential direction encompasses at least partially, and possibly completely, i.e., has a corresponding configuration and dimensions as, a fluid duct that is configured in the check valve assembly.

Depending on a relative position of the valve body in terms of the valve seat, various flow cross sections through the check valve, or the fluid duct, respectively, are set. In other words, there is a first flow cross section through the check valve in a first position of the valve body relative to the valve seat, and in a second position which is different from the first position there is a second flow cross section which is different from the first cross section through the check valve.

The check valve can be designed in such a manner that the check valve completely blocks in one position of the valve body, thus implements a flow cross section of zero. However, it can also be provided that the check valve is designed in such a manner that a minimum flow cross section unequal to zero arises across all potential positions of the valve body such that a flow through the check valve is possible at all times, even in the blocked direction.

The valve body which interacts with the valve seat is a component part of the check valve element. The valve seat includes the sealing face which in at least one position of the valve body interacts in a sealing manner with the valve seat, or bears in a sealing manner on the latter, respectively. The valve body is mounted in a resilient-elastic manner, thus is impinged with a spring force when deflected out of the resting position of the valve body, the spring force urging the valve body in the direction of the resting position, or into the resting position. The valve body herein also may be urged in the direction of the valve seat, or onto the latter, respectively.

In order for the spring force to be implemented, the valve body by way of the plurality of spring arms is connected to the holding ring which, when viewed in a section, encompasses or substantially surrounds the valve body in the at least one position, for example in the resting position. The valve body, in terms of the longitudinal central axis or the repositioning direction thereof, respectively, is disposed so as to be spaced apart from the holding ring in the radial direction. The spring arms are present in the radial direction between the valve body and the holding ring, the spring arms connecting the valve body to the holding ring in a resilient-elastic manner. The holding ring may be configured so as to be continuous in the circumferential direction. Alternatively, there can of course also be an interruption of the holding ring in the circumferential direction.

The valve body is repositionable by the springs arms relative to the holding ring in the direction of the repositioning direction, specifically repositionable in a parallel manner in the axial direction. The axial direction may be in the direction of the longitudinal central axis of the valve body and/or the longitudinal central axis of the holding ring. A parallel repositioning capability is to be understood to be a repositioning capability in such a manner that the valve body in the first position is parallel to the valve body in the second position, thus in two dissimilar positions lies, possibly completely, in two mutually parallel imaginary planes. It goes without saying that the parallel repositioning capability also includes slight tilting which can arise during the operation of the check valve assembly, for example on account of a fluid flow through the check valve. To this extent, it is sufficient for the valve body, or the sealing face thereof, respectively, in dissimilar positions to be disposed so as to be only substantially parallel to itself.

The fastening of the check valve element, in particular in a valve receptacle of the check valve assembly into which the fluid duct opens, takes place by the latching body, or the at least one latching protrusion, respectively. The latching body herein is embodied so as to be in one piece with and materially integral to the holding ring, is thus present so as to be a single conjoint component with the latter. This component is embodied as a punched component and/or a deep-drawn component, for example. For example, first the spring arms are configured by punching in a first machining operation, and the latching body is subsequently configured by deep-drawing. It goes without saying that the component can also be produced, or configured, respectively, in another manner.

The latching body serves for fastening the check valve element in a latching manner in the valve receptacle, or in the fluid-conducting installation in which the fluid receptacle is configured, respectively. The latching body extends away from the valve body in the axial direction, such as specifically in the direction that faces away from the fluid duct opening into the valve receptacle. In other words, the latching body, proceeding from the holding ring, extends away from the valve seat. The latching body includes the latching protrusion which ultimately serves for fastening the check valve element in a latching manner by engaging in a latching receptacle which is configured on or in the fluid-conducting installation, respectively. The latching receptacle may be a circular latching groove which is continuous in the circumferential direction, for example.

The latching protrusion and the latching receptacle may be designed in such a manner that incorporating the latching protrusion in the latching receptacle is readily possible in at least one direction, specifically the assembling direction of the check valve element, while repositioning in the direction counter thereto is however reliably precluded once the latching protrusion has engaged in the latching receptacle. In other words, the force to be applied to the check valve element during assembling is less than the force required for releasing the check valve element.

To this end, the latching protrusion in the resting position thereof and/or with the latching protrusion engaging in the latching receptacle, is disposed at an angle greater than 0° and smaller than 90°, for example. The resting position herein is to be understood to be the disposal of the latching protrusion which prevails as long as the check valve element is disposed outside the fluid-conducting installation and consequently outside the valve receptacle. The angle may be at least 10°, at least 20°, or at least 30°, or alternatively is at most 45°.

A refinement of the check valve element provides that the latching body at least in regions is configured so as to be cylindrical, in particular circular-cylindrical. The latching body, proceeding from the holding ring, thus extends in the axial direction in the form of a cylinder. The latching body herein, at least in regions, may be configured so as to be continuous in the circumferential direction. In particular, that region of the latching body that directly adjoins the holding ring is configured so as to be continuous in the circumferential direction, whereas a region that is disposed so as to be spaced apart from the holding ring is interrupted by at least one clearance or gap in order for the latching protrusion to be configured in a resilient-elastic manner. The cylindrical design embodiment of the latching body has the advantage of being simple to produce and moreover simple to assemble.

A further embodiment of the check valve element provides that the latching protrusion is disposed on that side of the latching body that faces away from the holding ring. In other words, the latching protrusion, when viewed in the axial direction, is spaced apart from the holding ring. A deformation of the holding ring, which may influence the valve body and thus the valve action of the check valve, is reliably avoided in this manner.

In the context of a further embodiment of the check valve element, the latching protrusion is present as a region of the latching body that is curved outward in the radial direction. The outwardly curved region of the latching body is disposed in such a manner that the outwardly curved region engages in a latching manner in the latching receptacle when the check valve is incorporated into the valve receptacle. For example, the outwardly curved region of the latching body is present on a free end of the latching body in the axial direction, thus on a periphery of the check valve element that faces away from the holding ring. The implementation of the latching body in this manner enables a particularly cost-effective production of the check valve element.

A further embodiment of the check valve element provides that, additionally to the latching protrusion, at least one further latching protrusion which is likewise resiliently-elastically repositionable in the radial direction is present, wherein the latching protrusion and the further latching protrusion in the circumferential direction are separated by a clearance or gap which is configured in the latching body. In order for a reliable fastening of the check valve element in the fluid-conducting installation, or the valve receptacle, respectively, to be guaranteed, the further latching protrusion, additionally to the latching protrusion, is configured on the latching body. The latching protrusion and the further latching protrusion are ideally designed in a mutually analogous manner such that the explanations pertaining to the latching protrusion may also be referred to in the context of the further latching protrusion.

The two latching protrusions, thus the latching protrusion and the further latching protrusion, are mutually spaced apart in the circumferential direction. The latching protrusion and the further latching protrusion may be diametrically opposite one another. The two latching protrusions are mutually separated in the circumferential direction, specifically by the clearance or gap which is configured in the latching body. For example, the clearance in the axial direction extends across at least 10%, at least 20%, at least 25%, at least 30%, at least 40%, or at least 50%, of the extent of the check valve in the axial direction. Additionally or alternatively, the extent of the clearance or depth of the gap in the axial direction can be at most 50%, at most 40%, at most 30%, or at most 25%, in terms of the extent of the check valve element in the same direction.

A further embodiment of the check valve element provides that the clearance is configured so as to be peripherally open in the direction facing away from the holding ring. In other words, the clearance penetrates that periphery of the check valve element that faces away from the holding ring, the periphery, when viewed in the longitudinal section, being formed by the free end of the check valve element. A particularly positive spring effect of the latching protrusion, or a high degree of flexibility of the latching protrusion, respectively, is implemented on account of the peripherally open design embodiment of the clearance.

In a refinement of the check valve element, the curved region of the latching body, when viewed in the axial direction, adjoins the cylindrical region of the latching body. This has already been pointed out above. The curved region of the latching body is present on that side of the cylindrical region that faces away from the holding ring, specifically when viewed in the axial direction in particular. A positive positional stability of the check valve element in the valve receptacle, or in the fluid-conducting installation, respectively, is guaranteed by the aid of the cylindrical region of the latching body which is present between the holding ring and the curved region. The cylindrical region reliably prevents in particular tilting of the check valve element in the valve receptacle. This is achieved, for example, in that the cylindrical region by way of the external circumference thereof upon being assembled in the fluid-conducting installation bears on an internal circumference of the valve receptacle, and may specifically bear thereon in a continuous manner in the circumferential direction.

In a further embodiment of the check valve element, the latching body by way of a curved transition region transitions to the holding ring. The latching body and the holding ring are configured so as to be in one piece with and materially integral to the transition region. It is ensured with the aid of the transition region that weakening and/or damage to the material by virtue of the deformation of the check valve element during the production thereof is reliably avoided. To this end, the radius of the curvature of the transition region is chosen in a suitable manner. The radius of the curvature may be at least 10%, at least 15%, at least 20%, or at least 25%, in terms of the extent of the check valve element in the axial direction.

In the context of a further embodiment of the check valve element, the spring arms are configured so as to be arcuate or helical. The spring arms, proceeding from the valve body, extend in the radial direction up to the holding ring. The spring arms are configured so as to be in one piece with and materially integral to the valve body as well as the holding ring. The spring arms between the valve body and the holding ring may not run exclusively in the radial direction, even while it goes without saying that this may be provided. Rather, the spring arms, in addition to the radial component, have a circumferential component, the spring arms thus extending in the circumferential direction. For example, each of the spring arms, when viewed in the circumferential direction, encompasses the valve body by at least 45°, at least 90°, at least 135°, at least 190°, at least 225°, at least 270°, or more. An outstanding spring action is implemented by way of an embodiment of the spring arms of this type.

A check valve assembly, having a check valve element according to the embodiments in the context of this specification, has a resiliently-elastically mounted valve body with a sealing face and by way of spring arms is resiliently-elastically connected in such a manner to a holding ring which encompasses the valve body in at least one position that the valve body is repositionable in a parallel manner in the axial direction. It is provided herein that the holding ring is configured so as to be in one piece with and materially integral to a latching body for fastening the check valve element in a latching manner in a fluid-conducting installation of the check valve assembly, the latching body in the axial direction extending in the direction facing away from the valve body and having at least one latching protrusion which is resiliently-elastically repositionable in the radial direction.

The advantages of a design embodiment of the check valve assembly, or of the check valve element, respectively, of this type have already been pointed out. The check valve assembly as well as the check valve element can be refined according to the explanations in the context of this specification such that reference to this extent is made thereto.

BRIEF DESCRIPTION OF THE DRAWINGS

These and other aspects and advantages will become more apparent and more readily appreciated from the following description of exemplary embodiments, taken in conjunction with the accompanying drawings of which.

DETAILED DESCRIPTION OF THE PREFERRED EMBODIMENT

Figure 1:
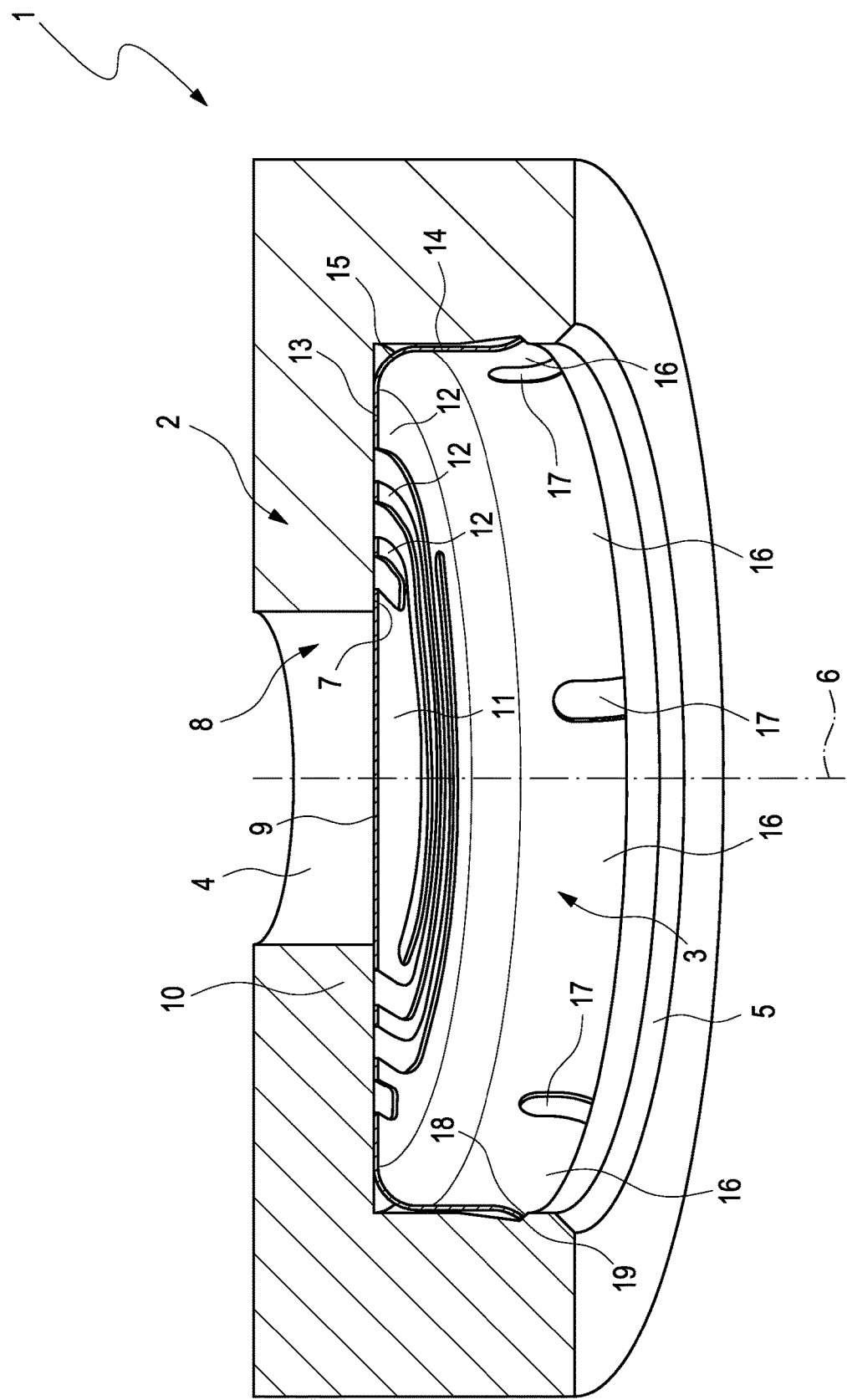
FIG. 1 is a schematic, partially sectional view through a check valve assembly having a fluid-conducting installation as well as a check valve element.

Reference will now be made in detail to the preferred embodiments, examples of which are illustrated in the accompanying drawings, wherein like reference numerals refer to like elements throughout.

FIG. 1 shows a schematic partially sectional illustration of a check valve assembly 2 which includes a fluid-conducting installation 2 and a check valve element 3. A fluid duct 4 which opens into a valve receptacle 5 which is likewise present in the fluid-conducting mouth 2 is configured in the fluid-conducting installation 2. The valve receptacle 5 in the radial direction, in terms of a longitudinal central axis 6 of the valve receptacle 5, has larger dimensions than the fluid duct 4. In the exemplary embodiment illustrated here, the longitudinal central axis 6 of the valve receptacle 6 coincides with a longitudinal central axis of the fluid duct 4 such that the fluid duct 4 in terms of the longitudinal central axis 6 opens centrically into the valve receptacle 5.

The check valve element 3 disposed in the valve receptacle 5, conjointly with a valve seat 7 that is configured by the fluid-conducting installation 2, configures a check valve 8. The valve seat 7 is configured on a wall 10 of the fluid-conducting installation 2 that encloses a mouth opening 9 of the fluid duct 4 into the valve receptacle 5. The valve seat 7 encompasses, for example, continuously and completely, the fluid duct 4 or the mouth opening 9 of the fluid duct 4, respectively, in the circumferential direction.

The check valve element 3 includes a valve body 11 which in the exemplary embodiment illustrated here is designed as a valve disk. The valve body 11 interacts with the valve seat 7 so as to configure the check valve 8. In one position of the valve body 11, the latter bears in a sealing manner on the valve seat 7 such that a fluidic connection between the fluid duct 4 and the valve receptacle 5 is precluded. In other words, the valve body 11 in this position closes the mouth opening 9 of the fluid duct 4.

The valve body 11 by way of a plurality of spring arms 12 is mounted so as to be elastically repositionable in the axial direction in terms of the longitudinal central axis 6, specifically is mounted on a holding ring 13 which encompasses or substantially surrounds the valve body 11 in at least one position of the valve body 11. It can be provided herein that the valve body 11 and the holding ring 13 are in mutual alignment in at least one position of the valve body 11, thus are disposed in a common imaginary plane. The holding ring 13, specifically by way of a curved transition region 15, is connected to a latching body 14 of the check valve element 3. The holding ring 13, the transition region 15, and the latching body 14 are designed so as to be materially integral to one another and in one piece with one another. For example, the holding ring 13, the transition region 15, and the latching body 14, or the component conjointly formed thereof, thus the check valve element 3, are composed of metal, in particular of sheet metal, for example of sheet steel.

The latching body 14 serves for fastening the check valve element 3 in a latching manner in the fluid-conducting installation 2, or in the valve receptacle 5, respectively. To this end, the latching body 14 in the axial direction extends in the direction that faces away from the valve body 11, and includes a latching protrusion 16 which is resiliently-elastically repositionable in the radial direction. A plurality of latching protrusions 16 are illustrated in the exemplary embodiment illustrated here, wherein two of the latching protrusion 16 are in each case mutually separated by one clearance or gap 17, specifically in the circumferential direction. To the extent that reference in this description is made only to the latching protrusion 16, or to the clearance 17, respectively, the respective explanations thus may at all times relate to all latching protrusions 16, or all clearances 17, respectively.

In order for the check valve element 13 to be fastened, the latching protrusion 16, or the latching protrusions 16, respectively, engages/engage in a latching receptacle 18 which is configured in the fluid-conducting installation 2, specifically so as to be peripherally open in the direction of the valve receptacle 5. When the check valve element 3 is being incorporated in the valve receptacle 5, the latching protrusion 16 in the radial direction is elastically deflected toward the inside. As soon as the latching protrusion 16 reaches the latching receptacle 18, the latching protrusion 16 on account of the spring action thereof in the radial direction is relaxed in an outward manner in the direction of the initial position of the latching protrusion 16, such that the check valve element 3 subsequently engages in a reliable, retaining manner in the latching receptacle 18.

The latching body 14 may have a cylindrical, in particular circular-cylindrical, region. The cylindrical region, when viewed in the axial direction, is present between the latching protrusion 16, or the clearance 17, respectively, and the valve body 11 and/or the transition region 15. The cylindrical region at least in regions, by way of an external circumferential face, may bear on an internal circumferential face of the fluid-conducting installation 2, wherein the internal circumferential face delimits the valve receptacle 5 in an outward radial direction.

It can be clearly seen that the latching protrusion 16 is present as a region of the latching body 14 that is curved outward in the radial direction. In other words, a periphery 19 of the check valve element 3 that faces away from the valve body 11 is curved outward in the radial direction. In order for an outstanding spring action of the latching protrusion 16 to be achieved, the clearance 17 is configured so as to peripherally open, thus penetrating the periphery 19 of the check valve element 3 in the axial direction.

Figure 2:
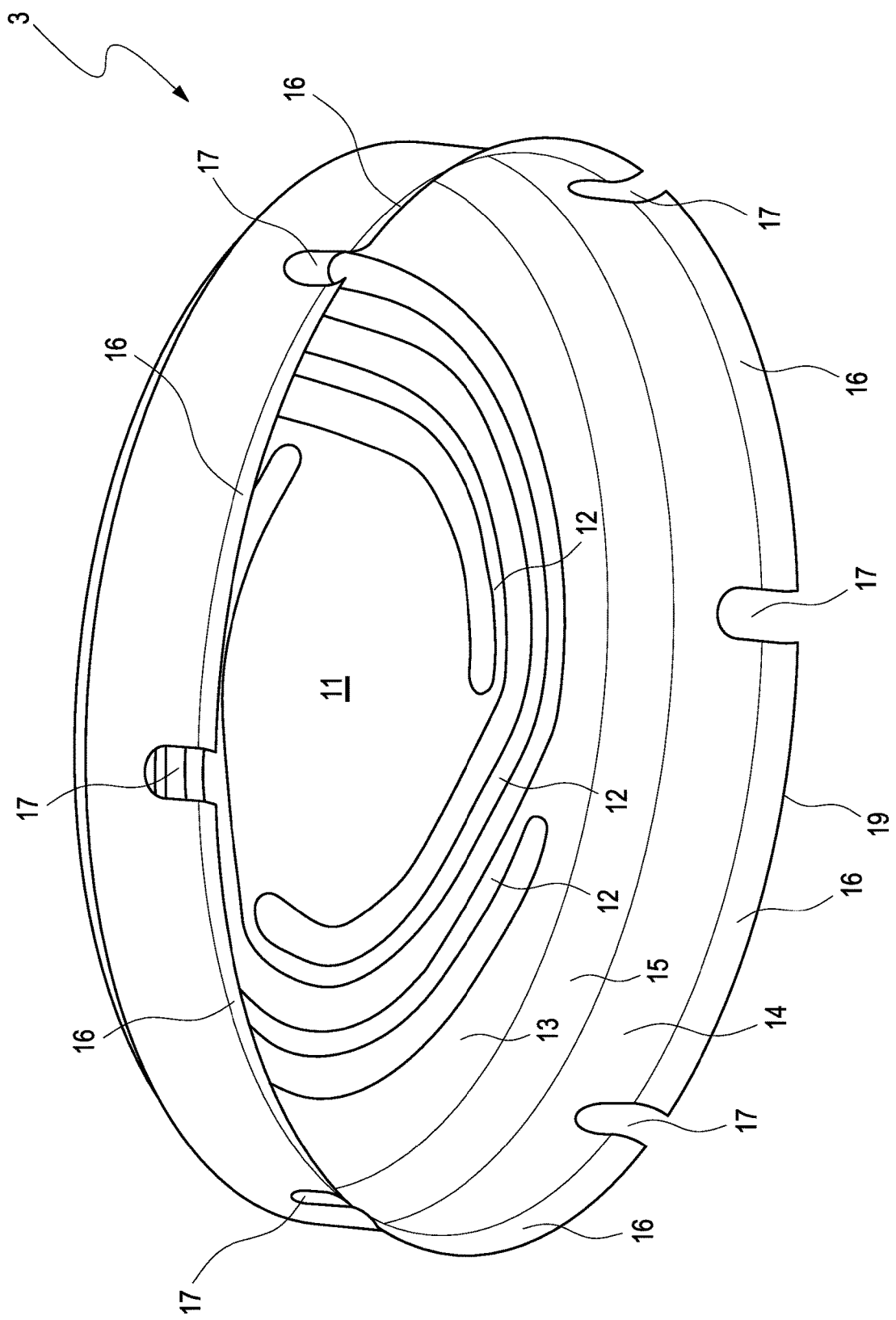
FIG. 2 is a schematic perspective view of the check valve element.

FIG. 2 shows a schematic illustration of the check valve element 3. It becomes evident that the spring arms 12 are configured so as to be materially integral to and in one piece with the valve body 11 on the one hand, and the holding ring 13 on the other hand. Moreover, the spring arms 12 run in a helical manner between the valve body 11 and the holding ring 13, thus in addition to a radial component also have a circumferential component in terms of the extent of the spring arms 12. For example, the spring arms 12, when viewed in terms of the longitudinal central axis 6, encompass the valve body 11 in the circumferential direction by at least 45°, at least 90°, at least 135°, at least 180°, or more, the longitudinal central axis 6 in the exemplary embodiment illustrated here also coinciding with a longitudinal central axis of the check valve element 3.

The design embodiment of the check valve element 3, or of the check valve assembly 1, respectively, described here enables, on the one hand, extremely simple assembling by latching the check valve element 3 into the fluid-conducting installation 2, or the valve receptacle 5. On the other hand, the check valve element 3 is producible in an extremely cost-effective manner by virtue of the low number of parts.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A check valve element for a check valve assembly in a fluid-conducting installation, comprising:
   a valve body resiliently-elastically mounted in the check valve element, formed of sheet metal, having a sealing face;
   a holding ring substantially surrounding the valve body in at least one position;
   helical spring arms, resiliently-elastically connected to the holding ring and the valve body, the valve body being repositionable in a parallel manner in an axial direction of at least one of the valve body and the holding ring, the spring arms formed as one piece with and materially integral to the valve body and the holding ring; and
   a latching body configured to fasten the check valve element in a latching manner in the fluid-conducting installation of the check valve assembly, the latching body formed as one piece with and materially integral to the holding ring by a curved transition region transitioning the latching body to the holding ring, the latching body extending along the axial direction in an opposing direction facing away from the valve body and having at least two latching protrusions resiliently-elastically repositionable in a radial direction, each latching protrusion separated in the circumferential direction by a gap in the latching body, the latching body being peripherally open in the opposing direction facing away from the holding ring.

2. The check valve element as claimed in claim 1, wherein the latching body at least in regions is cylindrical.

3. The check valve element as claimed in claim 2, wherein the latching protrusion is disposed on a side of the latching body facing away from the holding ring.

4. The check valve element as claimed in claim 3, wherein the latching protrusion is a curved region of the latching body curved outward in the radial direction.

5. The check valve element as claimed in claim 4, wherein the curved region of the latching body, when viewed in the axial direction, adjoins a cylindrical region of the latching body.

6. The check valve element as claimed in claim 2, wherein the latching body, when viewed in the axial direction, adjoins a cylindrical region of the latching body.

7. The check valve element as claimed in claim 6, wherein the spring arms are configured by punching, and the latching body is configured by deep-drawing.

8. The check valve element as claimed in claim 1, wherein the latching protrusion is disposed on a side of the latching body facing away from the holding ring.

9. The check valve element as claimed in claim 1, wherein the latching protrusion is a region of the latching body curved outward in the radial direction.

10. A check valve assembly, comprising:
    a check valve element formed of sheet metal, including
      a valve body resiliently-elastically mounted in the check valve element, having a sealing face;
      a holding ring substantially surrounding the valve body in at least one position;

helical spring arms, resiliently-elastically connected to the holding ring and the valve body, the valve body being repositionable in a parallel manner in an axial direction of at least one of the valve body and the holding ring, the spring arms formed as one piece with and materially integral to the valve body and the holding ring; and a latching body configured to fasten the check valve element in a latching manner in the fluid-conducting installation of the check valve assembly, the latching body, formed as one piece with and materially integral to the holding ring by a curved transition region transitioning the latching body to the holding ring, the latching body extending along the axial direction in an opposing direction facing away from the valve body, and having at least two latching protrusions resiliently-elastically repositionable in a radial direction, each latching protrusion separated in the circumferential direction by a gap in the latching body, the latching body being peripherally open in the opposing direction facing away from the holding ring.

11. The check valve assembly as claimed in claim 10, wherein the latching body at least in regions is cylindrical.

12. The check valve assembly as claimed in claim 11, wherein the latching protrusion is disposed on a side of the latching body facing away from the holding ring.

13. The check valve assembly as claimed in claim 12, wherein the latching protrusion is a curved region of the latching body curved outward in the radial direction.

14. The check valve assembly as claimed in claim 13, wherein the curved region of the latching body, when viewed in the axial direction, adjoins a cylindrical region of the latching body.

15. The check valve assembly as claimed in claim 10, wherein the latching body, when viewed in the axial direction, adjoins a cylindrical region of the latching body.

16. The check valve assembly as claimed in claim 15, wherein the spring arms are configured by punching, and the latching body is configured by deep-drawing.

17. The check valve assembly as claimed in claim 10, wherein the latching protrusion is disposed on a side of the latching body facing away from the holding ring.

18. The check valve assembly as claimed in claim 10, wherein the latching protrusion is a region of the latching body curved outward in the radial direction.

* * * * *